United States Patent
Rajaniemi

(10) Patent No.: US 10,004,055 B2
(45) Date of Patent: *Jun. 19, 2018

(54) METHOD FOR A SECURE DETACH PROCEDURE IN A RADIO TELECOMMUNICATION NETWORK

(71) Applicant: Nokia Technologies Oy, Espoo (FI)

(72) Inventor: Jaakko Rajaniemi, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/885,592

(22) Filed: Oct. 16, 2015

(65) Prior Publication Data

US 2016/0037476 A1  Feb. 4, 2016

Related U.S. Application Data

(63) Continuation of application No. 14/332,247, filed on Jul. 15, 2014, now Pat. No. 9,198,152, which is a
(Continued)

(51) Int. Cl.
*H05K 11/02* (2006.01)
*H04W 60/06* (2009.01)
(Continued)

(52) U.S. Cl.
CPC ........... *H04W 60/06* (2013.01); *H04L 63/126* (2013.01); *H04W 8/24* (2013.01); *H04W 12/06* (2013.01);
(Continued)

(58) Field of Classification Search
CPC ...... H04W 92/14; H04W 60/06; H04W 12/06
(Continued)

(56) References Cited

U.S. PATENT DOCUMENTS 5,396,543 A * 3/1995 Beeson, Jr. ............. H04W 8/18
370/328
5,519,706 A  5/1996 Bantz et al.
(Continued)

FOREIGN PATENT DOCUMENTS

EP  0544446 A2  6/1993
EP  0544447 A2  6/1993
(Continued)

OTHER PUBLICATIONS

B. Jabbari, "Intelligent Network Concepts in Mobile Communications", IEEE Communications Magazine, vol. 30, Issue 2, Feb. 1992.
(Continued)

*Primary Examiner* — Kiet Doan
(74) *Attorney, Agent, or Firm* — Mintz Levin Cohn Ferris Glovsky and Popeo, P.C.

(57) ABSTRACT

A method for performing a detach of a terminal registered to a telecommunication network is disclosed. The detach is performed by associating an identification for the terminal, deriving a signature for the identification, and allocating a pair consisting of the identification and the signature to the terminal. The method further includes sending the detach request including the identification and the identification signature from the registered terminal to the network. The detach request is received at the network and compared to a record of registration data of the terminal kept at the network. The terminal is detached from the network if the received detach request coincides with the record of registration data.

13 Claims, 3 Drawing Sheets

Related U.S. Application Data continuation of application No. 13/539,197, filed on Jun. 29, 2012, now Pat. No. 8,818,369, which is a continuation of application No. 12/874,870, filed on Sep. 2, 2010, now Pat. No. 8,238,910, which is a continuation of application No. 11/449,025, filed on Jun. 8, 2006, now Pat. No. 7,809,372, which is a continuation of application No. 09/627,684, filed on Jul. 28, 2000, now Pat. No. 7,085,567, which is a continuation of application No. PCT/EP98/08064, filed on Dec. 10, 1998.

(51) Int. Cl.
*H04W 12/06* (2009.01)
*H04W 12/12* (2009.01)
*H04W 76/06* (2009.01)
*H04W 8/24* (2009.01)
*H04L 29/06* (2006.01)
*H04W 8/26* (2009.01)

(52) U.S. Cl.
CPC .......... *H04W 12/12* (2013.01); *H04W 76/06* (2013.01); *H04L 63/123* (2013.01); *H04W 8/26* (2013.01)

(58) Field of Classification Search
USPC ....... 455/466, 433, 445, 411, 560, 410, 419, 455/434; 370/338, 328; 710/264, 260, 710/303; 379/59
See application file for complete search history.

(56) References Cited

U.S. PATENT DOCUMENTS

| | | | |
|---|---|---|---|
| 5,675,628 A | 10/1997 | Hokkanen | |
| 5,765,105 A | 6/1998 | Kuriki | |
| 5,898,933 A | 4/1999 | Kaschke | |
| 5,930,701 A | 7/1999 | Skog | |
| 5,987,325 A | 11/1999 | Tayloe | |
| 6,035,216 A | 3/2000 | Cheng et al. | |
| 6,039,624 A | 3/2000 | Holmes | |
| 6,081,705 A | 6/2000 | Houde et al. | |
| 6,091,953 A * | 7/2000 | Ho | H04W 28/08 455/433 |
| 6,097,951 A | 8/2000 | Emam et al. | |
| 6,104,929 A | 8/2000 | Josse et al. | |
| 6,148,201 A * | 11/2000 | Ernam | H04W 28/08 455/433 |
| 6,167,271 A | 12/2000 | Parker et al. | |
| 6,169,899 B1 | 1/2001 | Havinis et al. | |
| 6,173,173 B1 | 1/2001 | Dean et al. | |
| 6,185,416 B1 | 2/2001 | Rudokas et al. | |
| 6,195,546 B1 * | 2/2001 | Leung | H04W 8/245 340/5.1 |
| 6,208,628 B1 | 3/2001 | Monrad et al. | |
| 6,219,538 B1 | 4/2001 | Kaminsky et al. | |
| 6,347,227 B1 | 2/2002 | Johansson | |
| 6,665,529 B1 | 12/2003 | Mills, Jr. | |
| 7,085,567 B1 | 8/2006 | Rajaniemi | |
| 7,809,372 B2 | 10/2010 | Rajaniemi | |
| 8,238,910 B2 | 8/2012 | Rajaniemi | |
| 8,818,369 B2 | 8/2014 | Rajaniemi | |
| 9,198,152 B2 | 11/2015 | Rajaniemi | |
| 2003/0190937 A1 | 10/2003 | Karmi et al. | |

FOREIGN PATENT DOCUMENTS

| | | |
|---|---|---|
| EP | 0544448 A2 | 6/1993 |
| EP | 0544449 A1 | 6/1993 |
| EP | 0544456 A2 | 6/1993 |
| EP | 0544457 A2 | 6/1993 |
| EP | 0544460 A2 | 6/1993 |
| EP | 0544464 A2 | 6/1993 |
| EP | 0544469 A1 | 6/1993 |
| EP | 0570643 A1 | 11/1993 |
| EP | 0711090 A2 | 5/1996 |
| EP | 0827354 A2 | 3/1998 |
| EP | 0859531 A2 | 8/1998 |
| EP | 0978958 A1 | 2/2000 |
| EP | 1633165 A1 | 3/2006 |
| WO | WO-9607277 A2 | 3/1996 |
| WO | WO-9817074 A2 | 4/1998 |
| WO | WO-9835521 A2 | 8/1998 |
| WO | WO-9851106 A2 | 11/1998 |

OTHER PUBLICATIONS

Asha Mehrotra and Leonard S. Golding, "Mobility and Security Management in the GSM System and Some Proposed Future Improvements", Proceedings of The IEEE, vol. 86, No. 7., Jul. 1998.

GSM 04.80, TS 100 950, V6.1.1, (Feb. 1999), "Digital cellular telecommunications systems (Phase 2+); Mobile radio interface layer 3 supplementary services specification; Formals and coding", Release 1997.

GSM 03.60, Version 6.2.0, (Oct. 1998), Digital cellular telecommunications system (Phase 2+); General Packet Radio Service (GPRS); Service description; Stage 2, (GSM 03.60 version 6.2.0 Release 1997).

GSM 04.08, Version 3.13.0, "ETSI Mobile Radio Interface Layer 3 Specification", Feb. 1992.

* cited by examiner

METHOD FOR A SECURE DETACH PROCEDURE IN A RADIO TELECOMMUNICATION NETWORK

CROSS-REFERENCE TO RELATED APPLICATIONS

This application is a continuation of U.S. patent application Ser. No. 14/332,247, entitled "METHOD FOR A SECURE DETACH PROCEDURE IN A RADIO TELECOMMUNICATION NETWORK," filed Jul. 15, 2014, which is a continuation of U.S. patent application Ser. No. 13/539,197, now U.S. Pat. No. 8,818,369, filed Jun. 29, 2012, which is a continuation of U.S. patent application Ser. No. 12/874,870, now U.S. Pat. No. 8,238,910, filed on Sep. 2, 2010, which is a continuation of U.S. patent application Ser. No. 11/449,025, now U.S. Pat. No. 7,809,372, filed Jun. 8, 2006, which is a continuation of U.S. patent application Ser. No. 09/627,684, now U.S. Pat. No. 7,085,567 filed on Jul. 28, 2000, which is a continuation of International Application PCT/EP1998/008064, filed on Dec. 10, 1998. The subject matter of all of these applications is hereby incorporated by reference in their entirety.

FIELD OF THE INVENTION

The present invention relates to a method for performing a secure detach procedure in a radio telecommunication network, in particular in a so-called third generation network. Moreover, the present invention relates to a corresponding registration procedure for registering a subscriber to such a telecommunication network. Also, the present invention relates to corresponding devices of subscriber terminals and network controlling devices which are adapted to carry out these methods, and to a correspondingly adapted telecommunication network.

BACKGROUND OF THE INVENTION

In hitherto known telecommunication networks, a subscriber terminal as a first type radio transceiver device (hereinafter: mobile station MS), in order to be operated within a network, needs to be registered to the network NW, i.e. to a network controlling device like for example a mobile services switching center MSC (or an SGSN), which controls so called base station controllers BSC, which in turn control base stations BS as second type radio transceiver devices.

To this end, each subscriber has a subscriber identity module SIM to be inserted into the used mobile station MS as a respective terminal equipment. The SIM contains a pre-stored international mobile subscriber identity number IMSI, by which a user can be identified. However, in order to protect the user against being identified by an intruder in the network, each user is assigned a temporary mobile subscriber identity TMSI. This identification which changes either from time to time or from area to area (when combined with a location area identifier LAI) allows an "anonymous" identification of the user when using his terminal.

For details of the roughly described registration procedure including ciphering of transmitted data for authentication at registration, which details are considered to be not necessarily to be described here, the reader is referred to the plurality of respective publicly available GSM specifications.

Likewise, an attached or registered subscriber or mobile station, respectively, will have to perform a detach from the network under specific conditions. For example, the mobile station will be detached from the network and its registration will be abandoned, in case the SIM module is detached from the terminal equipment or the like.

In such cases, the mobile station MS sends a detach message to the network NW, the so-called IMSI DETACH INDICATION message. Upon receipt of the IMSI DETACH INDICATION the network controlling device (MSC) sets an inactive indication for the mobile station MS, while no response is returned to the mobile station itself. (For details, also in this context it is referred to the respective GSM specifications). Namely, no authentication is conducted at detach, when the mobile station initiating the detach procedure leaves the network.

Thus, there exists a possibility that a malicious user may obstruct or even terminate a third party's call by sending detach messages with random identities of mobile stations (i.e. random numbers of TMSI identifiers). Stated in other words, although it is not possible to interrupt the connection to a specific mobile station MS of a certain specified user by sending such a detach message, a lot of damage and irritation can be caused to a great number of users as well as to the operator of the network NW, when arbitrary calls and/or radio connections are blocked and/or terminated by the intention of a malicious third party.

A previously proposed approach to prevent this resides in performing an authentication procedure when a mobile station MS is to be detached from the network NW, i.e. upon receipt of a detach message at the network from the mobile station.

However, such a proposed authentication at detach is rather time consuming in many situations and has therefore only a limited applicability.

Moreover, performing an authentication procedure may not be feasible if the mobile station is performing power off, i.e. is switched off, or the available battery power is too low so that normal operation of the mobile station can not be assured any longer.

SUMMARY OF THE INVENTION

Hence, it is an object of the present invention to provide a simple and useful method for performing a detach from and/or a corresponding method for registration to a network, which prevent the above described problems.

According to the present invention, this object is achieved by a method for performing a detach of a terminal registered to a telecommunication network by associating an identification for said terminal, deriving a signature for said identification, and allocating a pair consisting of said identification and said signature to said terminal, said method comprising the steps of: sending a detach request including said identification and said identification signature from said registered terminal to said network; receiving said detach request at the network side; comparing said received detach request with a record of registration data of said terminal kept at the network side; and detaching said terminal from said network, if said received detach request coincides with said record of registration data.

According to the present invention, this object is furthermore achieved by a method for registration of a terminal to a telecommunication network, said method comprising the steps of: associating an identification for said terminal, deriving a signature for said identification, and allocating a pair consisting of said identification and said signature to said terminal.

Favorable refinements of the present invention are as defined in the respective dependent claims.

Thus, the present invention provides the advantage that a simple and useful method is available for preventing a malicious user to interrupt third party's calls by sending detach messages with random identities of mobile stations.

In particular, the proposed method enables an immediate authentication of the mobile station requesting a detach procedure upon receipt of the detach request message or the detach request, respectively. This authentication procedure is not time consuming and also applicable in case of a mobile station being switched off (entering the power off state) or having a battery level which is too low for normal operation of the mobile station. Thus, even in such situations, the detach procedure may be carried out correctly.

Moreover, due to the fact that the detach request is composed of the identifier as well as the identifier signature, the proposed immediate authentication process is highly secure, because in practice it is impossible to find such a matching pair by just taking two arbitrary numbers.

BRIEF DESCRIPTION OF THE DRAWINGS

The present invention will be more readily understood with reference to the accompanying drawings, in which.

DETAILED DESCRIPTION OF PREFERRED EMBODIMENTS

Figure 1:
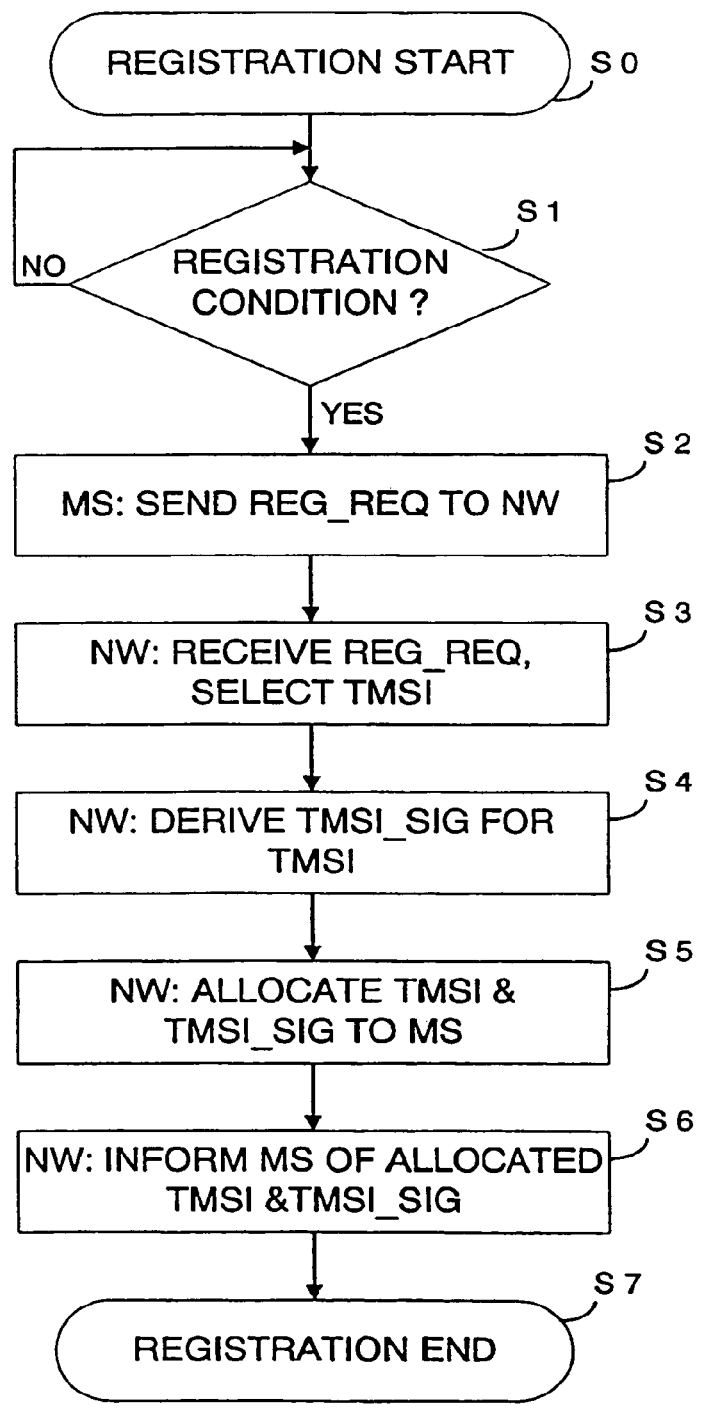
FIG. 1 shows a flowchart of the registration procedure according to the present invention.

According to the present invention, when a mobile station MS as a first type radio transceiver station or, in general, a terminal is registered to a network NW like for example a so-called third generation radio telecommunication network, i.e. registered to the network controlling device MSC, it sends an attach/registration request (formed by one or more request messages), or dependent on the specific situation, a location update request to the network NW. A request as such (to be valid for being evaluated) may be composed of more than one transmitted messages.

The network NW, which for the present description is assumed to be represented by the network controlling device as for example an MSC, in turn associates an identification to the mobile station MS. Associating such an identification may be achieved in that the network NW allocates an identification to the terminal MS The identification may be represented by the temporary mobile subscriber identity TMSI. Alternatively, as the identification also the international mobile subscriber identity IMSI could be used. In general, any suitable identification may be used for identifying a respective mobile terminal MS, and the present invention is not restricted to the use of the TMSI or the IMSI as identifications.

Additionally, the network NW allocates a signature (e.g. TMSI signature TMSI_SIG) corresponding to the identification and derived therefor on the basis of, for example, a coding algorithm like an algorithm known as the "Pretty Good Privacy" (PGP) algorithm, to the terminal, i.e. the mobile station MS. However, the deriving of the signature for and/or of the identification is not limited to the network side. Namely, alternatively, also the terminal MS may derive a signature for the identification by way of calculation. In this connection, information as to which algorithm for calculating the signature is to be chosen is in such a case exchanged between the network NW and the terminal MS. After having thus derived the signature, the deriving side (i.e. NW or MS) informs the other side of the derived signature.

Both data items, the identification TMSI as well as the identification signature TMSI_SIG are allocated to the mobile station MS in a secure mode, so that it is impossible for any other mobile station or any other third party to know the pair of these data items TMSI, TMSI_SIG. Of course, if in the above mentioned example case the terminal MS derives the signature, the derived signature is informed to the network NW in a secure mode, to be securely associated to the identification, so that it is impossible for any other mobile station or any other third party to know the pair of these data items TMSI, TMSI_SIG.

In particular, according to the present invention, the network NW or the network controlling device MSC, respectively, associates and/or allocates also a signature TMSI_SIG in combination with the identifier TMSI itself to the mobile station MS. Moreover, according to the present invention, the associated signature is used together with the identifier in a detach procedure, as described below.

Namely, in case the mobile station MS leaves the network NW and is to be detached therefrom due to, e.g., switching off the mobile station MS or a low battery charging state at the mobile station's side or a removal and/or taking off a SIM card (subscriber identity module) as examples for a respective predetermined detach condition for the mobile station, a detach procedure according to the present invention is performed. In particular, in this detach procedure, the mobile station MS when requesting and/or initiating detach, sends a detach request to the network NW. The detach request contains the identification TMSI and the identification signature TMSI_SIG as a pair of data items. The network compares the received two data items which identify the requesting mobile station with the previously allocated one's. If the comparison yields that the received data items are identical to the previously allocated one's, the detach is performed correctly at the network side. Because no other mobile station MS except the one to which the identifier signature and corresponding identifier were previously allocated to, knows the pair of data items, it is impossible for other mobile stations to perform a malicious detach procedure.

The following description of the drawings will set out the operation of the present invention in greater detail.

FIG. 1 shows a flowchart of the registration procedure. In step S0 the registration procedure starts. In the subsequent step S1, it is checked at the mobile station MS side, whether a registration condition is present. Such a registration condition may for example be present when said mobile station newly attaches to a network NW and has initially to be registered (authenticated) at the network NW side, or when said mobile station has moved within the network NW and a location update of said mobile station MS becomes necessary. Alternatively, also a cell update in case of the terminal having moved to an extent that the previous cell has been left and a new cell was entered represents such a registration condition. Also, in third generation networks an URA (UTRAN Registration Area, UTRAN standing for "Universal Terrestrial Radio Access Network") update is possible, thus representing a registration condition in the sense of the present invention. Such an URA update may be necessary in case of third generation networks, in which a radio network controller RNC handles the location information in terms of registration areas. Such updates become for example necessary when the mobile station has to be registered to another controlling device MSC within the network due to "excessive" moving within the network and/or in case of a request of the mobile station MS for a traffic channel assignment.

If no registration condition is present in step S1, the procedure returns to step S1 until a registration condition is present. Then, the process proceeds to step S2.

In step S2, the mobile station MS sends a registration request REG_REQ to the network NW, i.e. to the network controlling device, e.g. the MSC. The registration request REG_REQ is for example an attach request for initial registration of said mobile station MS as a first type radio transceiver device in said network, or a location update request for updating a previous registration of said mobile station MS in said network, or any other request which is transmitted when any of the above described further possible registration conditions is satisfied.

In step S3, this registration request REG_REQ is received by the network controlling device. In response to receiving said request, the network controlling device selects or determines an identification like for example TMSI for the requesting mobile station MS.

Moreover, in a subsequent step S4 of the described example, the network NW (network controlling device MSC) also derives an identification signature TMSI_SIG for said identification TMSI. (However, as mentioned above, the signature may also be derived by the mobile station MS itself upon receipt of a corresponding instruction from the network NW, and the signature will then have to be informed to the network NW (not represented in the figures).)

Both of these data items as parameters for identifying a specific mobile station MS, namely, the identification TMSI and the (separate) identification signature TMSI_SIG are allocated to the mobile station MS in a subsequent step S5. Of course, the network NW keeps a record of the thus assigned pair of data items.

The data items TMSI and TMSI_SIG are allocated in a secure mode, so that a third party may not obtain a knowledge of the assigned data items. Then, in step S6 of the described example, they are transmitted from the network NW side to the mobile station MS side in order to inform the mobile station of the allocated identification TMSI and the identification signature TMSI_SIG.

Thereafter, in step S7, the registration procedure is completed.

Figure 2:
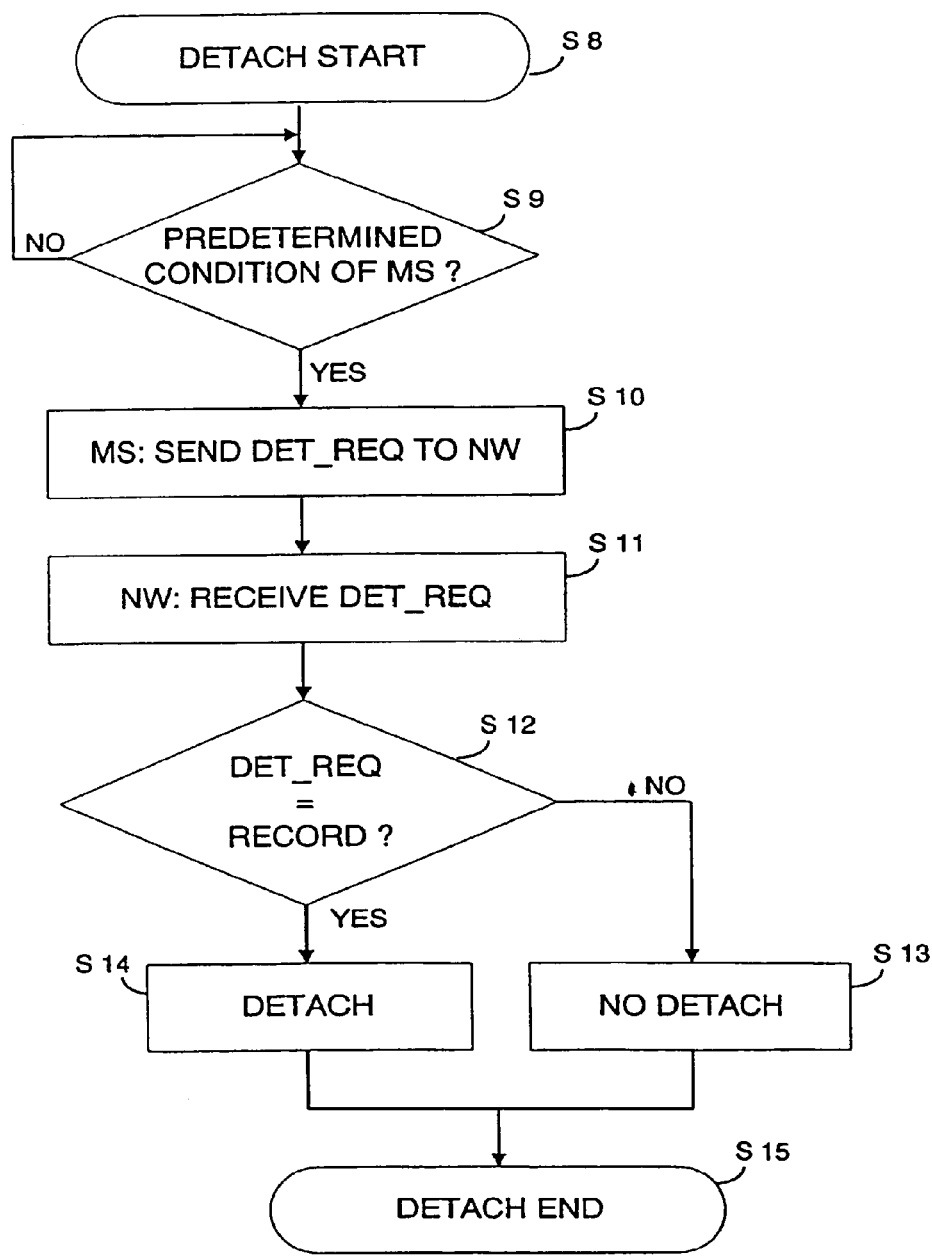
FIG. 2 shows a flowchart of the detach procedure according to the present invention.

FIG. 2 illustrates a flowchart of the detach procedure when a mobile station MS as a terminal is to be detached from the network it has previously been registered to.

The detach procedure starts in a step S8. In a subsequent step S9, at a respective mobile station MS side, it is checked whether a predetermined condition, i.e. a detach condition, of the mobile station MS is present. Such a detach condition may for example be met in case of a power off state of said mobile station MS, or in case a low battery charging state of the battery of the mobile station is detected. Alternatively, a user actuated command may fulfill the detach condition, for example, if another user wishes to use the mobile station MS as a terminal equipment and an SIM module (subscriber identity module) of the new user has to be inserted. This applies also in case of removal of the SIM module.

If no such detach condition as a predetermined condition is detected, the procedure loops until a corresponding condition is detected. If a detach condition is detected at the mobile station side, the mobile station MS sends a detach request DET_REQ to the network NW, i.e. to the network controlling device like an MSC, step S10.

The detach request DET_REQ contains said pair of said identification TMSI and said identification signature TMSI_SIG previously allocated to said mobile station MS upon registration of the mobile station to the network NW.

Figure 3:
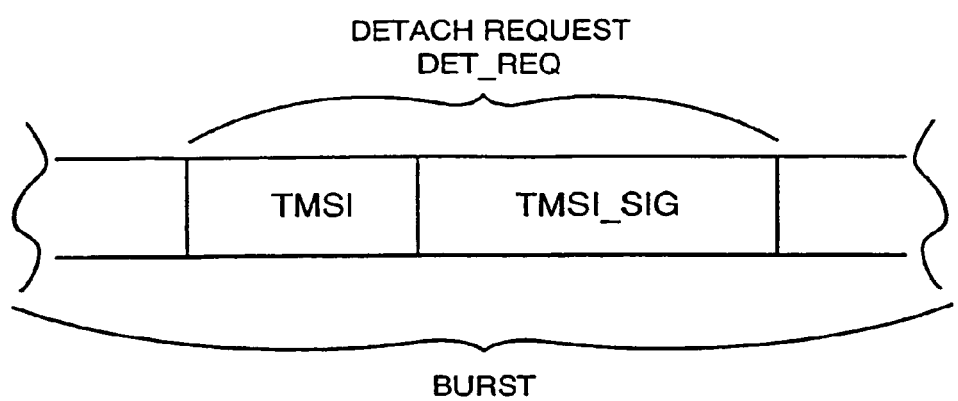
FIG. 3 shows a schematic representation of the data format used for the detach request or detach request message, respectively, according to the present invention.

In particular, the detach request DET_REQ, may for example, assume a data format as shown in FIG. 3 of the drawings. As roughly schematically illustrated therein, a burst transmitted from the mobile station MS to the network NW (controlling device) contains the detach request DET_REQ. The detach request contains the pair of the identification TMSI and the identification signature TMSI_SIG. Although the TMSI and TMSI_SIG are illustrated as being transmitted immediately one after the other in the burst, another burst format may be adopted in that there may be provided a guard period or dummy period (not shown) between the respective data items. Alternatively, each data item could be identified by a respective flag (not shown) indicating which data item is transmitted next, and transmitted prior to the respective data item. Moreover, in the latter case, the order of the specific transmitted data items would not be restricted to a specific one, but could be changed in an arbitrary manner, as long as the data items could be identified at the reception side. Furthermore, the detach request could be transmitted in a form such that for example, the identification and the identification signature could be transmitted in consecutive bursts as respective request messages which in combination result in the request as such.

In step S11, the detach request DET_REQ is received at the network NW side. In a following step S12, the received detach request DET_REQ is compared, data item per data item, i.e. separately for the identification TMSI and the identification signature TMSI_SIG, with a record of registration data of said terminal kept at the network side. The record is the record of the previously assigned pair of data items TMSI, TMSI_SIG kept at the network NW side, as mentioned above in connection with step S5, upon registration of a respective mobile station MS to the network NW.

Namely, at the network controller side a set of such records (e.g. in form of a table) of all allocated pairs of data items TMSI, TMSI_SIG for all respective mobile stations currently registered to the network is kept, and in step S12 a check is made as to whether the received pair of TMSI, TMSI_SIG is contained as a record in said set of records (table).

If the pair of data items received with the detach request message DET_REQ is not contained in said record (NO in step S12), the procedure advances to step S13. In step S13, no detach operation is performed, and all registered mobile stations remain registered to the network. Also, an authentication procedure (registration) could then be started in this case in step S13. Therefore, a malicious user sending arbitrary identifications can not terminate any call or detach any other user, since he is not enabled to send a pair of matching data items of an identification TMSI and a corresponding identification signature TMSI_SIG.

If, however, the comparison in step S12 yields that the received detach request DET_REQ contains a pair of data items TMSI, TMSI_SIG which is contained in the table of records, i.e. has previously been allocated to a mobile station upon registration, (YES in step S12) then the flow proceeds to step S14.

In step S14, a detach operation is performed, since it has been verified that the detach request DET_REQ originated from an authentic mobile station which was previously registered to the network. Thus, an immediate authentication procedure can be carried out by comparing the pair of received data item TMSI, TMSI_SIG with a record of previously allocated (assigned) data items. This assures that a detach operation is only performed for a mobile station MS as a respective terminal, if the request for detach originates from the mobile station MS itself. Hence, no malicious user can initiate a detach of arbitrary mobile stations since he can not know the pair of the identification TMSI and the corresponding signature TMSI_SIG.

Moreover, the authentication at detach is immediately effected at the network side without involving a repeated handshaking procedure with the mobile station. Thus, the authentication procedure can also be successfully performed in case the mobile station has a too low battery charging level, has been switched off, or the like.

The procedure has been described herein above mainly with reference to the temporary mobile subscriber identity TMSI being used as an identification and for deriving the signature therefor, since the TMSI is already defined in existing radio telecommunication systems and, therefore, can be advantageously be used in connection with the present invention. Nevertheless, the present invention can also be carried out in case a new identification and corresponding signature thereof are defined, while this, however, would require additional changes to existing agreed standards.

It should be understood that the above description and accompanying drawings are only intending to illustrate the present invention by way of example. Thus, the preferred embodiment of the invention may vary within the scope of the attached claims.

The invention claimed is:

1. An apparatus comprising:
   at least one processor; and
   at least one memory including computer program code, the at least one processor, the at least one memory, and the computer program code configured to cause the apparatus to at least:
   receive a signature from a network device; and
   send, to the network device and in response to a detach condition, a detach request including an identifier for the apparatus and the signature, wherein the signature is based on the identifier, wherein the detach request is sent after receiving the signature from the network device, and wherein sending the detach request enables the network device to perform a detach of the apparatus.

2. The apparatus according to claim 1, wherein the identifier is a temporary mobile subscriber identity.

3. The apparatus according to claim 1, wherein the identifier is an international mobile subscriber identity.

4. The apparatus according to claim 1, wherein the signature is a temporary mobile subscriber identity signature.

5. The apparatus according to claim 1, wherein the apparatus comprises and/or is comprised in a wireless terminal.

6. A non-transitory computer-readable medium encoded with instructions that, when executed by at least one processor, causes operations comprising:
   receive, at a wireless terminal, a signature from a network device; and
   send, by the wireless terminal and in response to a detach condition, a detach request to the network device, the detach request including an identifier for the wireless terminal and the signature, wherein the signature is based on the identifier, wherein the detach request is sent after receiving the signature from the network device, and wherein sending the detach request enables the network device to perform a detach of the wireless terminal.

7. The non-transitory computer-readable medium according to claim 6, wherein the identifier is a temporary mobile subscriber identity.

8. The non-transitory computer-readable medium according to claim 6, wherein the identifier is an international mobile subscriber identity.

9. The non-transitory computer-readable medium according to claim 6, wherein the signature is a temporary mobile subscriber identity signature.

10. A method comprising:
    receiving, at a wireless terminal, a signature from a network device; and
    sending, by the wireless terminal and in response to a detach condition, a detach request to the network device, the detach request including an identifier for the wireless terminal and the signature, wherein the signature is based on the identifier, wherein the detach request is sent after receiving the signature from the network device, and wherein sending the detach request enables the network device to perform a detach of the wireless terminal.

11. The method according to claim 10, wherein the identifier is a temporary mobile subscriber identity.

12. The method according to claim 10, wherein the identifier is an international mobile subscriber identity.

13. The method according to claim 10, wherein the signature is a temporary mobile subscriber identity signature.

* * * * *